United States Patent
Koberstein et al.

(10) Patent No.: US 10,639,957 B2
(45) Date of Patent: May 5, 2020

(54) VEHICLE COMPRESSOR SYSTEM

(71) Applicant: Ford Global Technologies, LLC, Dearborn, MI (US)

(72) Inventors: Manfred Koberstein, Troy, MI (US); Michael Steven Wallis, Belleville, MI (US); Alan Langley Moore, Benfleet (GB); Simon Arnold, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 15/472,341

(22) Filed: Mar. 29, 2017

(65) Prior Publication Data

US 2018/0281556 A1  Oct. 4, 2018

(51) Int. Cl.
| | |
|---|---|
| *B60H 1/00* | (2006.01) |
| *B60H 1/32* | (2006.01) |
| *B60L 1/00* | (2006.01) |
| *B60L 58/26* | (2019.01) |
| *B60L 3/00* | (2019.01) |

(52) U.S. Cl.
CPC ......... *B60H 1/00278* (2013.01); *B60H 1/004* (2013.01); *B60H 1/0045* (2013.01); *B60H 1/00392* (2013.01); *B60H 1/00428* (2013.01); *B60H 1/323* (2013.01); *B60H 1/3222* (2013.01); *B60L 1/003* (2013.01); *B60L 3/0046* (2013.01); *B60L 58/26* (2019.02); *B60H 2001/00307* (2013.01); *B60L 2240/34* (2013.01); *B60L 2240/545* (2013.01)

(58) Field of Classification Search
CPC ........................... B60H 1/00278; B60H 1/004; B60H 1/00428; B60H 1/323; B60H 1/00392; B60H 1/0045; B60H 1/3222; B60H 2001/00307; B60L 58/26

See application file for complete search history.

(56) References Cited

U.S. PATENT DOCUMENTS

| | | | |
|---|---|---|---|
| 8,875,529 B2 | 11/2014 | Rollinger et al. | |
| 2005/0133215 A1 | 6/2005 | Ziehr et al. | |
| 2008/0245503 A1* | 10/2008 | Wilson | B60H 1/00371 165/42 |

FOREIGN PATENT DOCUMENTS

| | | | | |
|---|---|---|---|---|
| DE | 102011000796 A1 * | 8/2012 | | B60H 1/004 |
| DE | 102011000796 A1 | 8/2012 | | |
| EP | 2918950 A1 | 9/2015 | | |
| EP | 2977254 A1 | 1/2016 | | |

OTHER PUBLICATIONS

English Translation of PREIS DE-102011000796-A1 (Year: 2019).*

* cited by examiner

*Primary Examiner* — Elizabeth J Martin
*Assistant Examiner* — Melodee Jefferson
(74) *Attorney, Agent, or Firm* — David Coppiellie; Brooks Kushman, P.C.

(57) ABSTRACT

A vehicle cooling system for cooling a vehicle battery may include a cabin cooling system having an electrical compressor arranged on a first refrigerant path and driven by a vehicle electrical system to cool a vehicle cabin, a battery cooling system having a mechanical compressor arranged on a second refrigerant path and driven by a vehicle engine, and a battery chiller in communication with both refrigerant paths and configured to cool coolant provided to a vehicle battery.

7 Claims, 1 Drawing Sheet

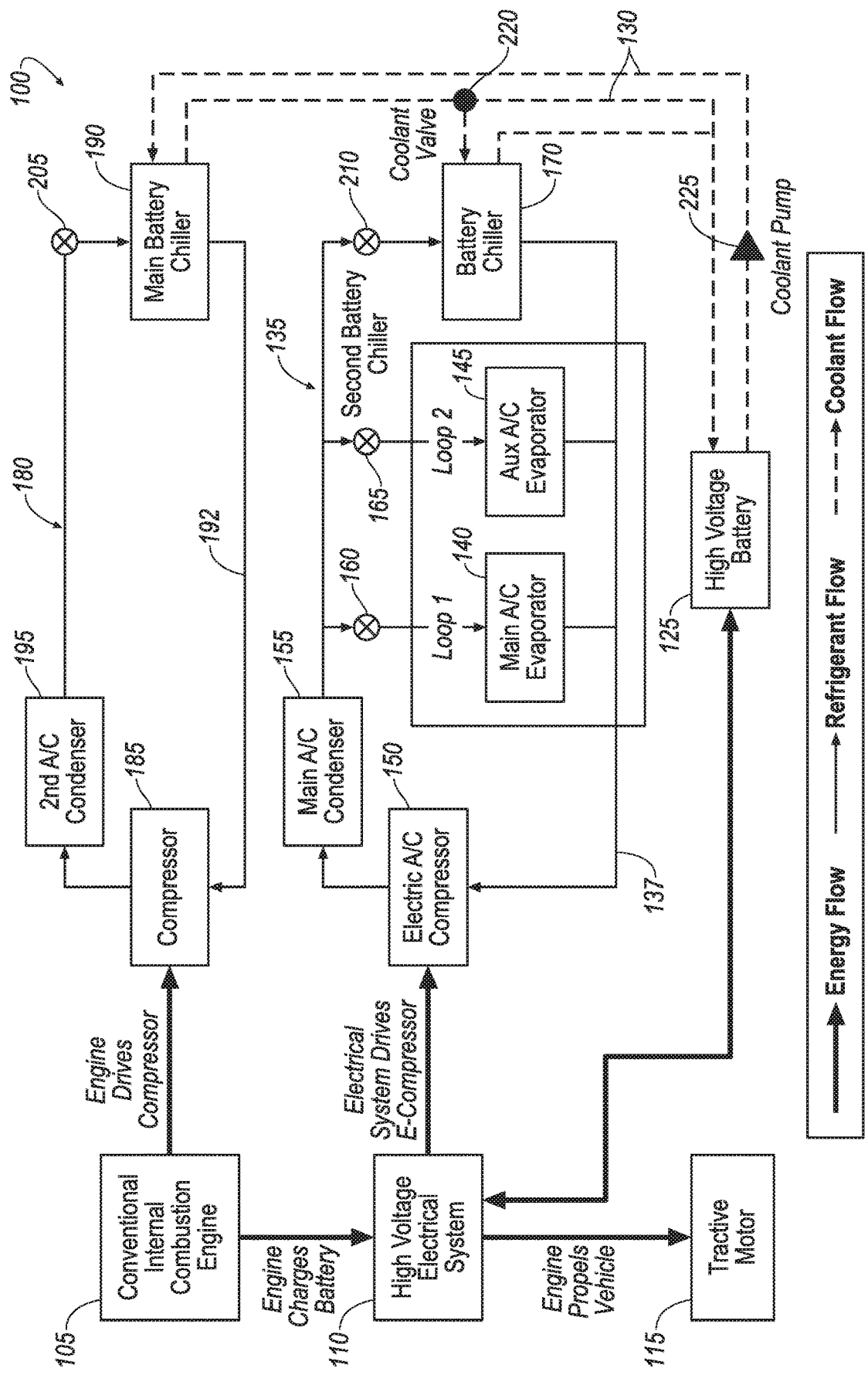

VEHICLE COMPRESSOR SYSTEM

TECHNICAL FIELD

The present disclosure relates generally to vehicle compressor system.

BACKGROUND

Vehicles such as battery electric vehicles (BEV) contain a battery, such as a high voltage battery, to act as an energy source for the vehicle. The battery performance, including capacity and cycle life can change depending on the operating temperature of the battery. It may be desirable to maintain the battery within a specified temperature range while the vehicle is operating or while the vehicle is charging.

SUMMARY

A vehicle cooling system for cooling a vehicle battery may include a cabin cooling system having an electrical compressor arranged on a first refrigerant path and driven by a vehicle electrical system to cool a vehicle cabin, a battery cooling system having a mechanical compressor arranged on a second refrigerant path and driven by a vehicle engine, and the battery cooling system including a first chiller on the first refrigerant path to cool coolant provided to a vehicle battery.

A vehicle cooling system for cooling a vehicle battery may include a cooling system having a mechanical compressor and a battery chiller arranged on a battery refrigerant path separate from a cabin refrigerant path of a cabin cooling system, the mechanical compressor driven by a vehicle engine, and a coolant loop configured to supply coolant to a vehicle battery from the battery chiller.

A vehicle cooling system for cooling a vehicle battery may include a cabin cooling system having an electrical compressor arranged on a first refrigerant path and driven by a vehicle electrical system to cool a vehicle cabin, a first battery chiller arranged in parallel with the first refrigerant path and a coolant loop configured to supply coolant to a vehicle battery from the first chiller.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

The FIGURE illustrates a block diagram of a vehicle compressor system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Batteries of electric vehicles are often cooled during use to preserve the life cycle and maintain efficiencies and capacity. Often, coolant received from a chiller is used to cool the battery. A vehicle refrigeration system may cool the chiller. However, often times vehicles have an auxiliary refrigeration system, in addition to the main refrigeration system (e.g., a two evaporator system). These auxiliary systems often aid in cooling the vehicle cabin.

In these cases, a refrigerant loop for each of the batteries, the main refrigeration system, and the auxiliary refrigeration system would be required. These three refrigerant loops would connect to a single compressor and condenser. The third additional loop may cause the load of the chiller to degrade the cooling performance of the cabin evaporators. The third loop may also complicate the control of the three loops due to the load varying on each individual loop. Further, the system may recognize refrigerant migration, as well as noise vibration and harshness (NVH) issues. To mitigate these issues, two compressors and condensers could be added to the system. However, electrical compressors may have a high dollar cost associated with them. It could also be costly in terms of energy usage since a second electrical compressor would be powered by the vehicle's electrical system.

Disclosed herein is a system for a hybrid electric vehicle (HEV) that includes a conventional belt-driven A/C compressor to the gasoline engine. This compressor may supply a dedicated refrigerant loop for the battery chiller. This may cool the chiller at the same time that the battery is being charged by the engine. Concurrently, the other A/C system which cools the cabin would be supplied by an electric compressor independent of engine operation. This loop may be either a single evaporator system or a dual evaporator system.

The mechanical compressor is arranged on a separate refrigerant path and only cools the chiller and not the cabin, allowing the mechanical compressor to be relatively small. Additionally, or alternatively, the mechanical compressor may be a variable displacement compressor as well to aid in controlling the cooling capacity.

Furthermore, a chiller may be added via a third loop on the cabin cooling system. The chiller may be used in combination with the dedicated chiller loop as a supplement. This extra chiller could be smaller than otherwise required, making it easier to control and implement with less risk than a larger-sized single chiller connected to the cabin.

By adding a chiller and/or a mechanical compressor, the need for two electric compressors is avoided. Further, cabin cooling is not degraded, as would be the case if one compressor was used to cool both the cabin and the chiller. Further, the chiller is mainly only in use during vehicle charging of the battery via the vehicle engine or in special cases where the vehicle engine could also be operating.

The FIGURE illustrates a block diagram of a vehicle compressor system 100 (also referred to herein as a battery cooling system 100) for an electric vehicle such as a battery electric vehicle (BEV), Hybrid Electric vehicle (HEV), or plug-in hybrid electric vehicle (PHEV.) The vehicle compressor system 100 may cool both the vehicle cabin as well as the vehicle battery.

The system 100 may include a conventional internal combustion engine 105. The internal combustion engine 105 may charge a battery 125 of a high-voltage electrical system 110 of the vehicle. The HV electrical system 110 may then provide power and propel a traction motor 115.

During charging and use the battery 125 may be cooled via coolant loop 130. The coolant of the coolant loop 130 may traditionally only be cooled by a chiller (not shown) within a cabin cooling system 135. That is, the chiller is cooling the coolant loop 130 in this arrangement. However, as discussed herein, the coolant of the coolant loop 130 may be cooled by one or more auxiliary chillers.

The cabin cooling system 135 may be responsible to maintaining the temperature within a vehicle cabin. Various demands may be made of the cabin cooling system 135 in an effort to maintain a certain level of comfort for the vehicle passengers and driver.

The cabin cooling system 135 may include a first refrigerant path 137. The cabin cooling system 135 includes a dual-evaporator system and may include a main evaporator 140 and an auxiliary evaporator 145. The evaporators 140, 145 may pass refrigerant to a cabin compressor 150. The cabin compressor 150 may be a variable speed compressor configured to automatically adjust its refrigerant capacity based on a desired cabin temperature. The cabin compressor 150 may be driven by the electrical system 110.

The cabin compressor 150 may compress the refrigerant received from the evaporators 140, 145. A main cabin condenser 155 may condense a superheated refrigerant received from the compressor 150 and reject heat therefrom into the ambient air. This may be achieved via a fan (not shown) or other mechanism.

The cabin cooling system 135 may include a plurality of expansion device (electronic or thermal) and/or shut-off valves. The expansion device and shut-off valve may be integrated into a signal component or may be separate devices. In the example shown in the FIGURE, a main valve 160 and an auxiliary valve 165 may provide variable amounts of refrigerant to the respective evaporators 140, 145.

The battery cooling system 100 may include a second cooling system 180 for supplying a dedicated refrigerant loop for a main battery chiller 190 (also referred to herein as main chiller 190, or second chiller 190). The second cooling system 180 may include a second refrigerant path 192 separate from the first refrigerant path 137 of the cabin cooling system 135. The second cooling system 180 includes a mechanical compressor 185. Unlike the cabin compressor 150 that is driven by the electrical system 110, the mechanical compressor 185 is driven by the combustion engine 105. The mechanical compressor 185 may be a conventional belt-driven compressor, which are typically less expensive than traditional electrical compressors. The mechanical compressor 185 may compress refrigerant and provide the refrigerant to a second condenser 195. The second condenser 195 may condense the refrigerant.

The main chiller 190 may be cooled by the second cooling system 180 along the second refrigerant path 192 independent of the cabin cooling system 135 and may provide coolant via loop 130 to the battery 125. Thus, the main chiller 190 may be cooled concurrently with battery charging. A main chiller expansion valve 205 may be arranged between the second condenser 195 and the main chiller 190 in order to control refrigerant flow to the main chiller 190.

A cabin auxiliary chiller 170 (also referred to herein as auxiliary chiller 170 and first chiller 170) may be arranged in line with the main condenser 155 of the cabin cooling system 135 along the first refrigerant path 137, and the main chiller 190. In the example shown in the FIGURE, the auxiliary chiller 170 may be arranged in parallel with the first refrigerant path 137. The auxiliary chiller 170 may also receive coolant from the battery 125. The auxiliary chiller 170 may be smaller than otherwise required by typically vehicle A/C systems. The smaller size may make the chiller easier to control and implement with less risk than that of a larger chiller. A second chiller expansion valve 210 may be arranged between the auxiliary chiller 170 and main condenser 155 to control refrigerant flow to the auxiliary chiller 170.

A coolant valve 220 may be arranged between the main chiller 190 and the auxiliary chiller 170 to control coolant flow between the two chillers 170, 190. Furthermore, a coolant pump 225 may be arranged on loop 130 to pump coolant from the battery 125 and recirculate the coolant to the main chiller 190.

While the main chiller 190 and the auxiliary chiller 170 are illustrated as being arranged in series, the two chillers 190, 170 may also be arranged in parallel.

The valves arranged on the refrigerant paths 180, 135, including the main valve 160, auxiliary valve 165, second chiller expansion valve 210, and main chiller expansion valve 205 may be expansion valves, for example a thermal expansion valve (TXV) or an electronic expansion valve, configured to control the rate of flow of refrigerant. The valves may maintain respective pressures and control the cooling capacity of the chillers.

The coolant valve 220 may also be a proportioned valve. In combination with the coolant pump 225, the coolant flow rate and the inlet coolant temperatures for each chiller may be controlled.

Accordingly, the system described herein includes an additional compressor, condenser and at least one auxiliary chiller for cooling the high voltage battery. Costs are saved by using a mechanical compressor in lieu of an electrical one for the additional compressor. Further, the addition of an auxiliary chiller may further aid in providing coolant to the battery. The auxiliary chiller may be smaller than typically required and may thus provide for a more controlled and manageable system. By using these additional components, the need for three coolant/refrigerant loops as typically needed in dual evaporator systems may be eliminated. Further, using a mechanical compressor driven by the combustion engine prevents an additional draw on the vehicle's electrical system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle cooling system for cooling a vehicle battery, comprising:
    a cabin cooling system having an electrical compressor arranged on a first refrigerant path and driven by a vehicle electrical system to cool a vehicle cabin,
    a battery cooling system having a mechanical compressor arranged on a second refrigerant path and driven by a vehicle engine,
    the battery cooling system including a first chiller on the first refrigerant path to cool coolant provided to a vehicle battery, wherein the battery cooling system includes a second chiller arranged on the second refrigerant path and the second chiller is arranged in series with the first chiller;
    a coolant loop configured to provide the coolant to the vehicle battery, at least one of the first chiller and the second chiller being in communication with the coolant loop to cool the coolant therein; and a coolant pump arranged on the coolant loop.

2. The system of claim 1, further comprising at least one valve arranged on the coolant loop to control the rate of coolant supplied by at least one of the first chiller or the second chiller.

3. A vehicle cooling system for cooling a vehicle battery, comprising:
- a cooling system having a mechanical compressor and a battery chiller arranged on a battery refrigerant path separate from a cabin refrigerant path of a cabin cooling system, the mechanical compressor driven by a vehicle engine, and
- a coolant loop configured to supply coolant to a vehicle battery from the battery chiller;
- a cabin chiller in communication with both refrigerant paths and the coolant loop to cool coolant provided to a vehicle battery, wherein the cabin chiller is arranged in series with the battery chiller; and
- a coolant pump arranged on the coolant loop.

4. The system of claim 3, further comprising at least one valve arranged on the coolant loop to control the rate of coolant supplied by at least one of the battery chiller or the cabin chiller.

5. A vehicle cooling system for cooling a vehicle battery, comprising:
- a cabin cooling system having an electrical compressor arranged on a first refrigerant path and driven by a vehicle electrical system to cool a vehicle cabin,
- a first battery chiller arranged in parallel with the first refrigerant path, and
- a coolant loop configured to supply coolant to a vehicle battery from the first chiller;
- a battery cooling system having a mechanical compressor arranged on a second refrigerant path and driven by a vehicle engine, and a second chiller, wherein the first battery chiller is arranged in series with the second chiller; and
- a coolant pump arranged on the coolant loop.

6. The system claim 5, wherein both the first chiller and the second chiller are in communication with the coolant loop to cool the coolant therein.

7. The system of claim 5, further comprising at least one valve arranged on the coolant loop to control the rate of coolant supplied by at least one of the first chiller or the second chiller.

* * * * *